United States Patent
Shahidi et al.

(10) Patent No.: US 10,059,300 B2
(45) Date of Patent: Aug. 28, 2018

(54) CLOSED-FORM SEATBELT RETRACTOR ASSEMBLY

(71) Applicant: Ford Global Technologies, LLC, Dearborn, MI (US)

(72) Inventors: Behrooz Shahidi, Novi, MI (US); Tofiqul Islam, Rochester Hills, MI (US); Madhusudhan Deme, Novi, MI (US); Rezaul Choudhury, Sterling Heights, MI (US); Wilson T. Ang, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/226,004

(22) Filed: Aug. 2, 2016

(65) Prior Publication Data

US 2018/0037190 A1    Feb. 8, 2018

(51) Int. Cl.
| | |
|---|---|
| *B60R 22/34* | (2006.01) |
| *B60R 5/04* | (2006.01) |
| *B60R 11/00* | (2006.01) |
| *B60R 22/18* | (2006.01) |

(52) U.S. Cl.
CPC .............. *B60R 22/34* (2013.01); *B60R 5/044* (2013.01); *B60R 2011/0024* (2013.01); *B60R 2022/1818* (2013.01); *B60R 2022/3402* (2013.01)

(58) Field of Classification Search
CPC ............ B60R 22/34; B60R 2022/3402; B60R 2022/1818; B60R 5/044; B60R 2011/0024; B60R 13/0268; B62D 25/087
USPC ........................ 280/807, 808, 801.1; 297/483
See application file for complete search history.

(56) References Cited

U.S. PATENT DOCUMENTS

| | | | |
|---|---|---|---|
| 5,921,605 A * | 7/1999 | Musukula | ............ B60N 2/0224 296/63 |
| 6,773,048 B1 | 8/2004 | Freeman | |
| 9,162,710 B1 | 10/2015 | Yamamoto | |
| 2014/0158567 A1 | 6/2014 | Park et al. | |

FOREIGN PATENT DOCUMENTS

| | | | |
|---|---|---|---|
| JP | 2011131843 A | * | 7/2011 |
| JP | 2014162315 A | * | 9/2014 |

* cited by examiner

*Primary Examiner* — Keith J Frisby
(74) *Attorney, Agent, or Firm* — Brooks Kushman P.C.

(57) ABSTRACT

A closed-form seatbelt retractor assembly includes a package tray having sidewalls that define an interior cavity. An aperture is disposed through at least one of the sidewalls. A bracket is connected to the package tray proximate the aperture to cover at least a portion of the aperture. A seatbelt retractor is secured to an interior surface of the bracket and disposed substantially entirely within the interior cavity.

15 Claims, 3 Drawing Sheets

CLOSED-FORM SEATBELT RETRACTOR ASSEMBLY

TECHNICAL FIELD

This disclosure relates to a structure for containing a seatbelt retractor, and more particularly, relates to an integrated closed-form package tray for a seatbelt retractor assembly having improved structural strength.

BACKGROUND

Vehicles often have a package tray or bulkhead located behind a rear seat and separating a rear cabin from a rear compartment such as a trunk. In many instances, seatbelt retractors are secured to a top surface of the package tray. The package tray and seatbelt retractors are covered by trim to hide the components from view.

SUMMARY

A closed-form seatbelt retractor assembly includes a package tray having sidewalls that define an interior cavity. An aperture is disposed through at least one of the sidewalls. A bracket is connected to the package tray proximate the aperture to cover at least a portion of the aperture. A seatbelt retractor is secured to an interior surface of the bracket and disposed entirely within the interior cavity.

A vehicle package tray includes a plurality of sidewalls that define a continuous closed-form interior cross-section disposed about an interior cavity. The vehicle package tray also includes a mountable bracket and a seatbelt retractor secured to an interior surface of the mountable bracket and disposed entirely within the interior cavity. The vehicle package tray further includes a fastener securing the mountable bracket to at least three discrete parallel plates of the package tray.

A method for providing a closed-form seatbelt retractor assembly includes providing a package tray having sidewalls that define a closed-form interior cavity. The sidewalls include an upper surface that has an aperture disposed therethrough. The method further includes securing a seatbelt retractor to a bracket. The method still further includes securing the bracket to the upper surface over at least a portion of the aperture such that the seatbelt retractor is disposed entirely within the interior cavity.

DETAILED DESCRIPTION

As required, detailed embodiments of the present invention are disclosed herein; however, it is to be understood that the disclosed embodiments are merely exemplary of the invention that may be embodied in various and alternative forms. For purposes of description herein, the terms "rear," "upper," "side," and "lower," and derivatives thereof shall relate to the package tray as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
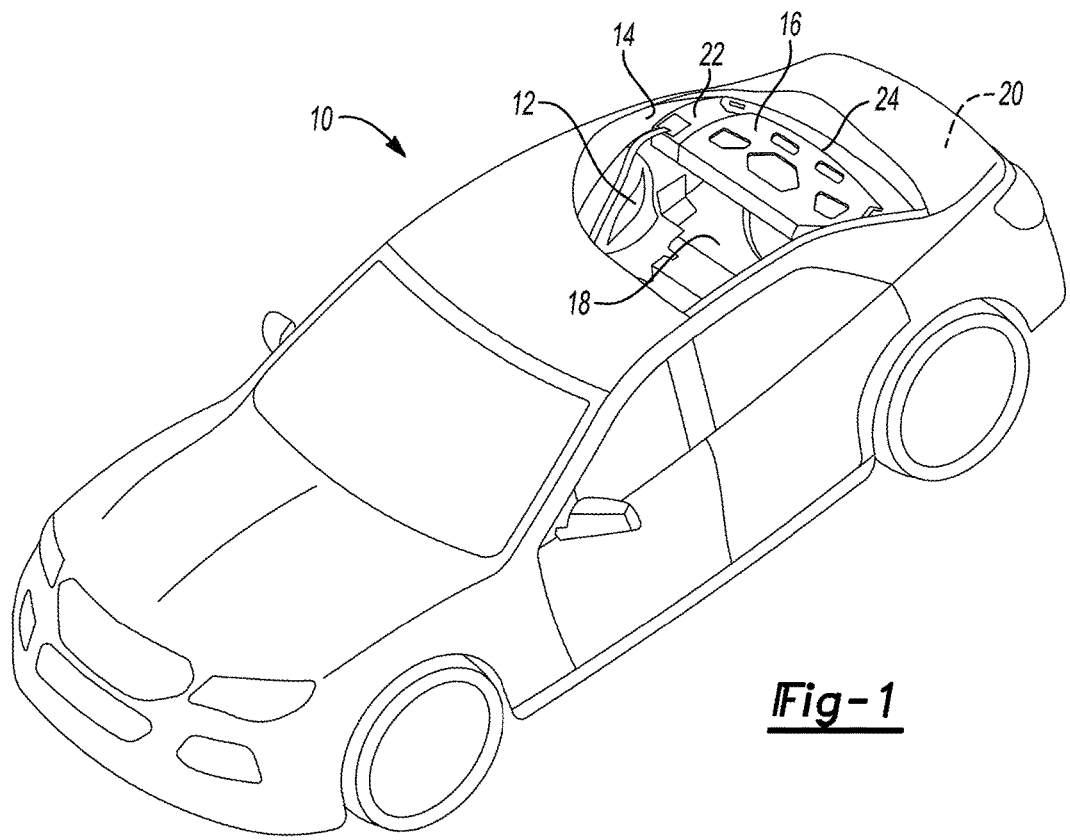
FIG. 1 is a perspective, partially sectioned view of a vehicle with portions of the vehicle removed to show a closed-form seatbelt retractor assembly.

As shown in FIG. 1, a rear portion of a vehicle 10 includes a wheelhouse 12 and an adjacent inner side panel 14. Extending from one side of the vehicle 10 to the other side of the vehicle 10 is a package tray or bulkhead 16. The package tray 16 separates a rear cabin 18 from a rear compartment 20, such as a trunk. In many approaches, the package tray 16 includes a package tray strainer 22 and a package tray panel 24. As discussed in greater detail elsewhere herein, the package tray strainer 22 is provided with increased structural rigidity to improve performance of the package tray strainer 22 under high loads from a retracting seatbelt webbing.

With reference to FIGS. 2-6, the package tray strainer 22 may in some aspects be an assembly that includes an upper package tray member 26, a lower package tray member 30, and a side package tray member 28. The upper package tray member 26 may be rigidly secured to an inner side panel 14 of the vehicle 10. The side package tray member 28 may be rigidly secured to one or both of the inner side panel 14 and a wheelhouse 12 of the vehicle 10. The lower package tray member 30 may be rigidly secured to one or both of the inner side panel 14 and the wheelhouse 12. In many approaches, package tray members are high strength steel, such as HSLA350 or other higher grade HSLA steel.

In some aspects, the package tray strainer 22 further includes a reinforcement bracket 34, as discussed in greater detail elsewhere herein.

Figure 2:
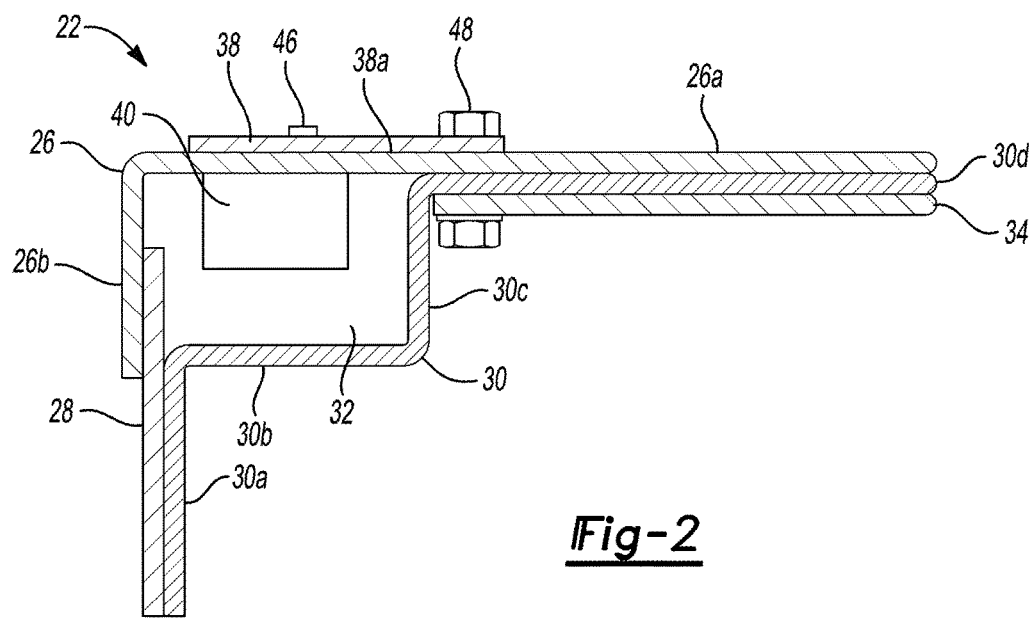
FIG. 2 is a schematic of a side view of the closed-form seatbelt retractor assembly.

As shown in the schematic view of FIG. 2, the upper package tray member 26 includes a top wall 26a and a forward side wall 26b. The side package tray member 28 is rigidly secured to a parallel region of the forward side wall 26b of the upper package tray member 26. The lower package tray member 30 includes a forward side wall 30a, a bottom wall 30b, a rear side wall 30c, and a top wall 30d. The forward side wall 30a of the lower package tray member 30 is rigidly secured to a parallel region of the side package tray member 28. The top wall 30d of the lower package tray member 30 is rigidly secured to the top wall 26a of the upper package tray member 26. The reinforcement bracket 34 is rigidly secured to the top wall 30d of the lower package tray member 30. Package tray members may be rigidly secured to each other through any known approach, such as through welding or use of fasteners (e.g. bolts or rivets).

In this way, the upper package tray member 26, the lower package tray member 30, and the side package tray member 28 together form a "closed-form" structure assembly. As used herein, a closed-formed structure assembly refers to an assembly that forms a cavity, such that continuous interior walls of the closed-formed structure entirely enclose a cross-section of the cavity. For example, as shown in the side views of FIGS. 2 and 3, the assembly of the upper package tray member 26, the lower package tray member 30, and the side package tray member 28 entirely encloses the internal cavity 32.

Use of at least three discrete package tray members has been found to increase the structural integrity of the package tray strainer 22. In other aspects, the package tray strainer 22 is formed of two or fewer discrete package tray members. In still other aspects, the package tray strainer 22 is formed of four or more discrete package tray members.

An aperture 36 (shown for example in FIG. 6) is formed in the top wall of the upper package tray member 26. The aperture 36 may be, for example, a polygonal or curved cut-out in the upper package tray member 26. The aperture 36 is appropriately sized to receive a seatbelt retractor 40. The seatbelt retractor 40 includes a rotatable spool (not shown) with a belt webbing 42 wrapped about the spool. The belt webbing 42 is extendable from the spool, i.e., by rotating the spool, to allow the belt webbing 42 to be extended across a vehicle occupant and engaged with a buckle (not shown) via a clip 44 on the belt webbing 42. The spool is spring-loaded to bias the belt webbing 42 toward the seatbelt retractor 40 to pull the belt webbing 42 against the occupant when the clip 44 is engaged with the buckle and to retract the belt webbing 42 onto the spool when the clip 44 is disengaged with the buckle.

The seatbelt retractor 40 is secured to an interior surface 38a of a mounting bracket 38. The mounting bracket 38 is preferably a flat plate and may be formed of high strength steel, such as HSLA350 or other higher grade HSLA steel. The seatbelt retractor 40 is rigidly secured to the mounting bracket 38, for example, by one or more rivets 46. The belt webbing 42 is threaded through a guide slot 50 of the mounting bracket 38.

The mounting bracket 38 is rigidly secured to the package tray strainer 22 proximate the aperture 36. For example, the mounting bracket 38 may be snapped or slid into a groove (not shown) of the upper package tray member 26 at one end of the mounting bracket 38, and fastened to the package tray strainer 22 by a bolt 48 at an opposite end of the mounting bracket 38. The mounting bracket 38 covers at least a portion of the aperture 36. In a preferred approach, the mounting bracket 38 is disposed about the entire aperture 36. In another approach, the mounting bracket 38 is arranged such that it covers less than the entire aperture 36.

The mounting bracket 38 is secured to the package tray strainer 22 such that the seatbelt retractor 40 is disposed within the interior cavity 32 formed by the package tray strainer 22 and the mounting bracket 38. In a preferred approach, the seatbelt retractor 40 is disposed entirely or substantially entirely within the interior cavity 32. The seatbelt retractor 40 is disposed entirely within the interior cavity 32 such that the body of the seatbelt retractor 40 is surrounded by the interior walls of the package tray strainer 22 (including, in some aspects, wall portions of the aperture 36 disposed through the upper package tray member 26). Because the mounting bracket 38 is secured to the top wall 26a of the upper package tray member 26, the seatbelt retractor 40 "hangs" within the internal cavity 32 formed by the package tray strainer 22. In still other approaches, the seatbelt retractor 40 may be disposed through an aperture in any surface of the package tray strainer 22, such as through a side wall or bottom wall of the package tray strainer 22. Furthermore, the seatbelt retractor 40 may contact or be fastened to more than one surface of the package tray strainer 22.

Positioning the seatbelt retractor 40 within an interior cavity 32 of the closed-form package tray strainer 22 has been found to increase the structural integrity of the package tray and seatbelt retractor assembly, thereby improving performance of the assembly under high loads from the belt webbing 42. Such high loads may be the result of a crash or sudden deceleration of the vehicle. Under high loads, the increased stiffness afforded by the assembly of the seatbelt retractor 40 within the closed-form package tray strainer 22 reduces relative motion between the seatbelt retractor 40 and the closed-form package tray strainer 22 as compared to previous assemblies. Furthermore, because the guide slot 50 of the mounting bracket 38 provides improved guidance control of the belt webbing 42 as the belt webbing 42 is withdrawn from the seatbelt retractor 40, the positioning of the seatbelt retractor 40 within the interior cavity 32 of the closed-form package tray strainer 22 also improves control of force vectors resulting from high loads.

Figure 3:
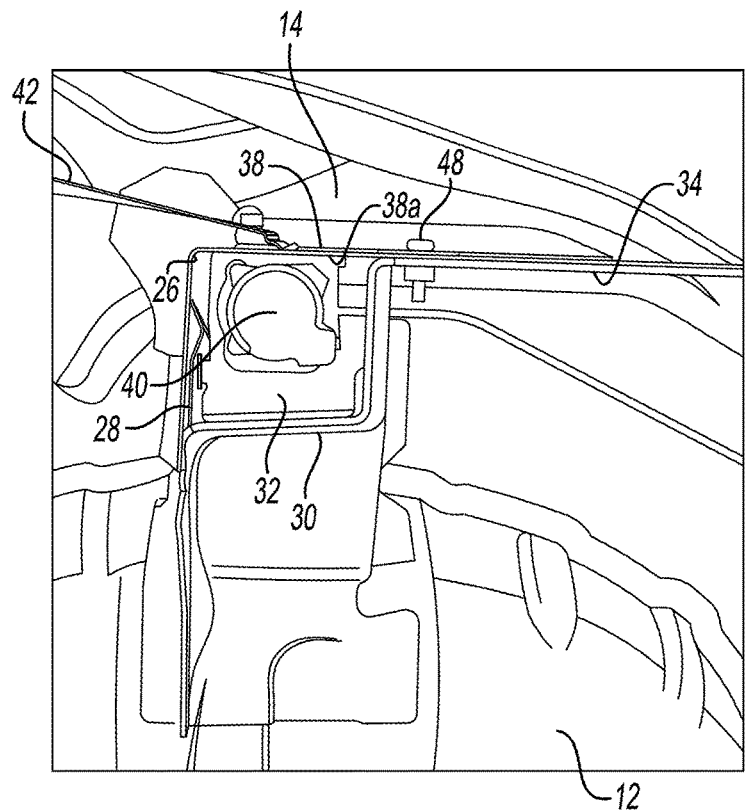
FIG. 3 is a side view showing a cross-section of the closed-form seatbelt retractor assembly.
Figure 4:
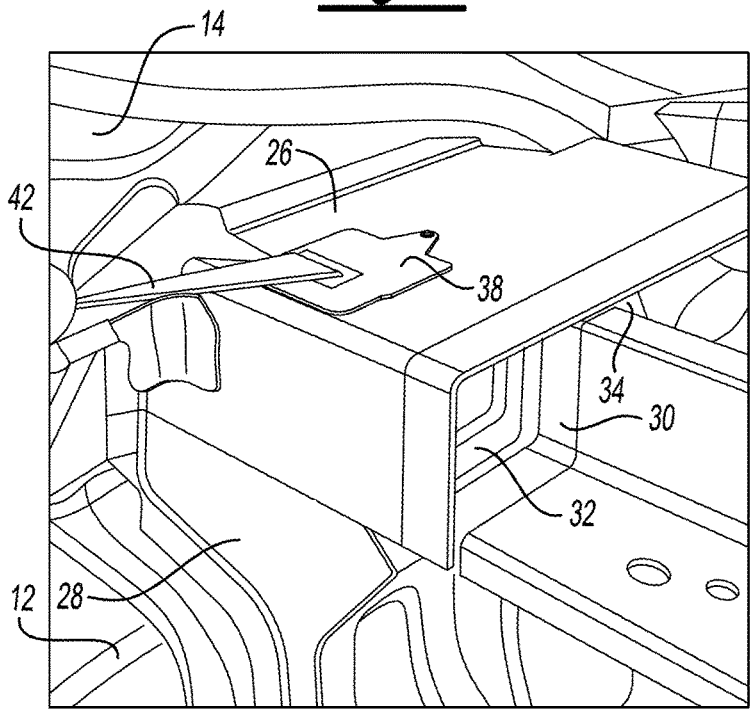
FIG. 4 is a front perspective view of the closed-form seatbelt retractor assembly.
Figure 5:
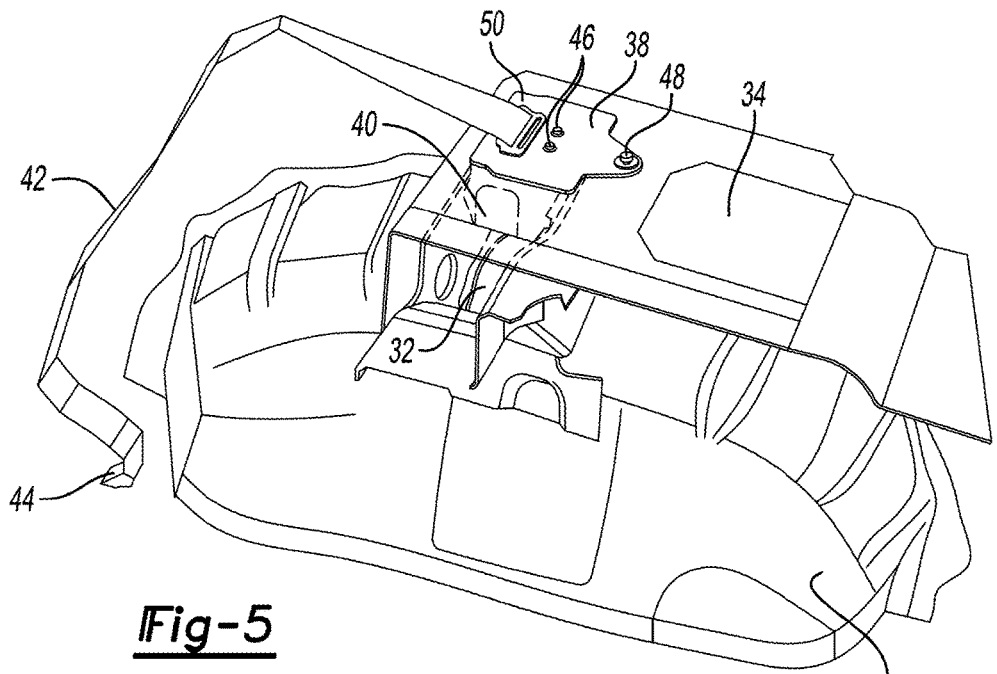
FIG. 5 is a rear perspective view showing the closed-form seatbelt retractor assembly.
Figure 6:
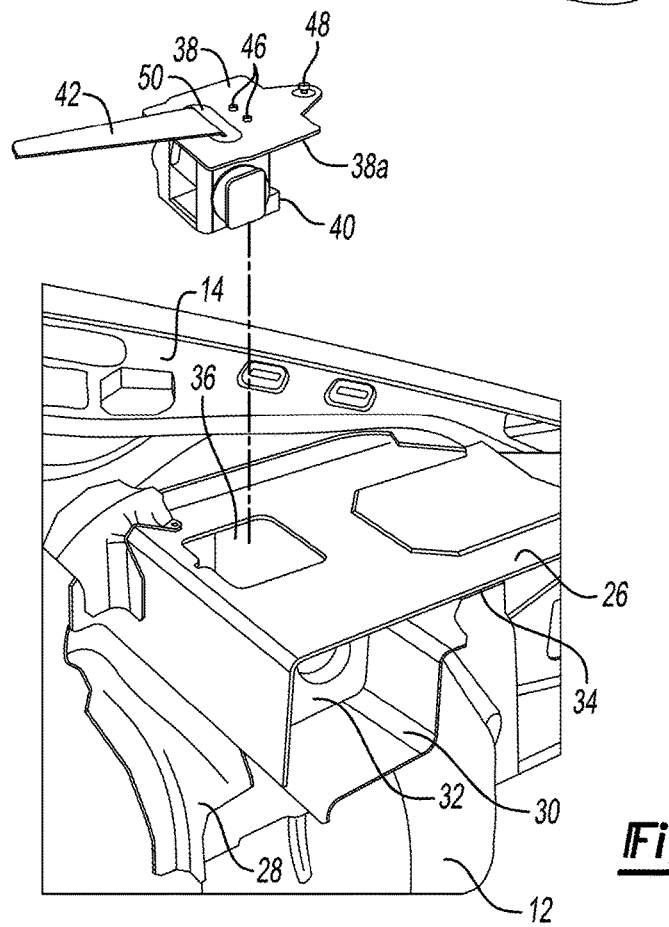
FIG. 6 is a perspective view showing the closed-form seatbelt retractor assembly in a partially disassembled configuration.

In a preferred approach, the bolt 48 passes through four discrete stack-up layers. For example, as shown in FIGS. 2 and 3, the bolt 48 may pass through parallel regions of the mounting bracket 38, the upper package tray member 26, the lower package tray member 30, and the reinforcement bracket 34. Advantageously, the four discrete stack-up layers provide increased rigidity in preventing the bolt 48 from pulling through the package tray strainer 22 under high belt webbing loads.

Although the package tray strainer 22 described herein relates to a package tray between a rear cabin 18 and a rear compartment 20, the package tray strainer 22 may also be adapted for use in other locations of a vehicle, such as on an interior side wall of a vehicle.

It will be appreciated by those skilled in the art that although the invention has been described by way of example with reference to one or more examples, it is not limited to the disclosed examples and that alternative examples could be constructed without departing from the scope of the invention as defined by the appended claims.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A closed-form seatbelt retractor assembly comprising:
a package tray having sidewalls that define an interior cavity, a first horizontal sidewall having a retainer aperture disposed therethrough;
a bracket defining a webbing aperture, the bracket and webbing aperture extending over the retainer aperture, the bracket engaging the first horizontal sidewall about an entire perimeter of the bracket; and
a seatbelt retractor secured to an interior surface of the bracket and disposed entirely within the interior cavity.

2. The closed-form seatbelt retractor assembly of claim 1, wherein the sidewalls define a continuous closed-form interior cross-section.

3. The closed-form seatbelt retractor assembly of claim 1, wherein the package tray comprises at least an upper package tray member rigidly connected to a lower package tray member, wherein interior sidewalls of the upper package tray member and the lower package tray member define the interior cavity.

4. The closed-form seatbelt retractor assembly of claim 3, wherein the bracket is connected to parallel regions of the upper package tray member rigidly and the lower package tray member by a fastener.

5. The closed-form seatbelt retractor assembly of claim 4, further comprising a reinforcement bracket, wherein the bracket is connected by the fastener to parallel regions of the upper package tray member, the lower package tray member, and the reinforcement bracket such that the fastener passes through four discrete layers.

6. The closed-form seatbelt retractor assembly of claim 3, further comprising a side package tray member rigidly connected to the upper package tray member and the lower package tray member, wherein interior sidewalls of the upper package tray member, the lower package tray member, and the side package tray member define the interior cavity.

7. The closed-form seatbelt retractor assembly of claim 6, wherein interior sidewalls of the upper package tray member, the lower package tray member, and the side package tray member define a continuous closed-form interior cross-section.

8. The closed-form seatbelt retractor assembly of claim 3, wherein the lower package tray member is rigidly connected to a wheelhouse.

9. The closed-form seatbelt retractor assembly of claim 1, wherein the webbing aperture guides a belt web from the seatbelt retractor disposed substantially entirely within the interior cavity to an exterior surface of the bracket.

10. The closed-form seatbelt retractor assembly of claim 1, wherein the seatbelt retractor is connected to the bracket by at least one fastener.

11. A vehicle package tray comprising:
a plurality of sidewalls that define a continuous closed-form interior cross-section disposed about an interior cavity, including:
an upper package tray member having a first top wall and a first forward side wall,
a lower package tray member having a second top wall disposed in engagement with the first top wall, and a second forward side wall, and
a side package tray member extending between and in engagement with an inner surface of the first forward side wall and an outer surface of the second forward side wall;
a mountable bracket;
a seatbelt retractor secured to an interior surface of the mountable bracket and disposed entirely within the interior cavity; and
a fastener securing the mountable bracket to at least three discrete parallel plates of the vehicle package tray.

12. The vehicle package tray of claim 11, wherein at least a first portion of the side package tray member extends into and faces the interior cavity.

13. The vehicle package tray of claim 11, wherein at least a second portion of the side package tray member is secured to a wheelhouse of a vehicle.

14. A vehicle package tray comprising:
sidewalls defining a cavity therebetween, including:
an upper package tray member having
a first top wall, and
a first side wall,
a lower package tray member having
a second top wall contacting the first top wall, and
a second side wall,
a side package tray member extending between the first side wall and the second side wall and into the cavity; and
a seatbelt bracket mounted to the first top wall and defining a webbing aperture.

15. The vehicle package tray of claim 14, wherein at least a first portion of the side package tray member is exposed within the cavity, and wherein at least a second portion of the side package tray member is secured to a wheelhouse of a vehicle.

* * * * *